(12) United States Patent
Thomas et al.

(10) Patent No.: US 7,947,784 B2
(45) Date of Patent: May 24, 2011

(54) REACTIVE COMPOUNDING OF HYDROGELS

(75) Inventors: Brian H. Thomas, Columbia City, IN (US); Donald L. Yakimicki, Warsaw, IN (US); Steven Charlebois, Goshen, IN (US)

(73) Assignee: Zimmer, Inc., Warsaw, IN (US)

( * ) Notice: Subject to any disclaimer, the term of this patent is extended or adjusted under 35 U.S.C. 154(b) by 4 days.

(21) Appl. No.: 11/941,478

(22) Filed: Nov. 16, 2007

(65) Prior Publication Data

US 2009/0131590 A1    May 21, 2009

(51) Int. Cl.
*C08G 81/02* (2006.01)
*C08J 3/24* (2006.01)

(52) U.S. Cl. ............. 525/386; 525/57; 525/61; 524/916

(58) Field of Classification Search ................... 525/57, 525/61, 386; 524/916
See application file for complete search history.

(56) References Cited

U.S. PATENT DOCUMENTS

| | | | |
|---|---|---|---|
| 3,200,178 A * | 8/1965 | Matsubayashi et al. ........ 264/78 |
| 3,862,265 A | 1/1975 | Steinkamp et al. |
| 3,875,302 A | 4/1975 | Inoue |
| 4,036,788 A | 7/1977 | Steckler |
| 4,058,491 A | 11/1977 | Steckler |
| 4,060,678 A | 11/1977 | Steckler |
| 4,071,508 A | 1/1978 | Steckler |
| 4,279,795 A | 7/1981 | Yamashita |
| 4,300,820 A | 11/1981 | Shah |
| 4,379,874 A | 4/1983 | Stoy |
| 4,451,599 A | 5/1984 | Odorzynski |
| 4,451,630 A | 5/1984 | Atkinson |
| 4,464,438 A | 8/1984 | Lu |
| 4,472,542 A | 9/1984 | Nambu |
| 4,640,941 A | 2/1987 | Park |
| 4,656,216 A * | 4/1987 | Muller et al. ................. 524/381 |
| 4,663,358 A | 5/1987 | Hyon |
| 4,664,857 A | 5/1987 | Nambu |
| 4,699,146 A | 10/1987 | Sieverding |
| 4,734,097 A | 3/1988 | Tanabe |
| 4,771,089 A | 9/1988 | Ofstead |
| 4,772,287 A | 9/1988 | Ray |
| 4,808,353 A | 2/1989 | Nambu |
| 4,842,597 A | 6/1989 | Brook |
| 4,851,168 A | 7/1989 | Graiver |
| 4,859,719 A | 8/1989 | Ofstead |
| 4,871,490 A | 10/1989 | Rosiak |
| 4,874,562 A | 10/1989 | Hyon |
| 4,915,974 A * | 4/1990 | D'Amelia et al. ............ 426/611 |
| 4,956,133 A | 9/1990 | Payne |
| 4,966,924 A | 10/1990 | Hyon |
| 4,988,761 A | 1/1991 | Ikada |
| 5,028,648 A * | 7/1991 | Famili et al. .................. 524/317 |
| 5,047,055 A | 9/1991 | Bao |
| 5,053,455 A * | 10/1991 | Kroggel et al. ................. 525/58 |
| 5,106,876 A | 4/1992 | Kawamura |
| 5,118,779 A | 6/1992 | Szycher |
| 5,122,565 A | 6/1992 | George |
| 5,157,093 A | 10/1992 | Harisiades |
| 5,189,097 A | 2/1993 | LaFleur |
| 5,192,326 A | 3/1993 | Bao |
| 5,244,799 A | 9/1993 | Anderson |
| 5,276,079 A | 1/1994 | Duan et al. |
| 5,288,503 A | 2/1994 | Wood |
| 5,306,311 A | 4/1994 | Stone |
| 5,311,223 A | 5/1994 | Vanderlaan |
| 5,315,478 A | 5/1994 | Cadwell |
| 5,334,634 A | 8/1994 | Bastiolo |
| 5,336,551 A | 8/1994 | Graiver |
| 5,358,525 A | 10/1994 | Fox |
| 5,360,830 A | 11/1994 | Bastiolo |
| 5,362,803 A | 11/1994 | LaFleur |
| 5,364,547 A | 11/1994 | Babb et al. |
| 5,407,055 A | 4/1995 | Tanaka |
| 5,409,966 A | 4/1995 | Duan et al. |
| 5,410,016 A | 4/1995 | Hubbell |
| 5,458,643 A | 10/1995 | Oka |
| 5,527,271 A | 6/1996 | Shah |
| 5,540,033 A | 7/1996 | Fox |
| 5,552,096 A | 9/1996 | Auda et al. |
| 5,576,072 A | 11/1996 | Hostettler |
| 5,580,938 A * | 12/1996 | Gutweiler et al. ............ 525/455 |
| 5,624,463 A | 4/1997 | Stone |
| 5,632,774 A | 5/1997 | Babian |
| 5,674,295 A | 10/1997 | Ray |
| 5,681,300 A | 10/1997 | Ahr |
| 5,705,296 A | 1/1998 | Kamauchi |
| 5,709,854 A | 1/1998 | Griffith-Cima |

(Continued)

FOREIGN PATENT DOCUMENTS

EP        0256293        2/1988

(Continued)

OTHER PUBLICATIONS

Carey et al. Advanced Organic Chemistry. Part B: Reactions and Synthesis. 4th ed. New York: Kluwer Academic, 2001. 892.*

(Continued)

*Primary Examiner* — Vasu Jagannathan
*Assistant Examiner* — Mark S Kaucher
(74) *Attorney, Agent, or Firm* — Cook Alex Ltd.

(57) ABSTRACT

This invention provides methods to form modified hydrogel materials using reactive compounding. The method includes mixing a hydrogel material with a plasticizer in a compounding apparatus. During mixing, a reactive chemical compound is added to the mixture that reacts with the hydrogel material to form a modified hydrogel material.

14 Claims, No Drawings

U.S. PATENT DOCUMENTS

| | | | |
|---|---|---|---|
| 5,711,960 A | 1/1998 | Shikinami | |
| 5,716,404 A | 2/1998 | Vacanti | |
| 5,723,331 A | 3/1998 | Tubo | |
| 5,834,029 A | 11/1998 | Bellamkonda | |
| 5,879,713 A | 3/1999 | Roth et al. | |
| 5,891,826 A | 4/1999 | Tsaur et al. | |
| 5,941,909 A | 8/1999 | Purkait | |
| 5,976,186 A | 11/1999 | Bao | |
| 5,981,826 A | 11/1999 | Ku | |
| 6,015,576 A | 1/2000 | See | |
| 6,017,577 A | 1/2000 | Hostettler | |
| 6,040,493 A | 3/2000 | Cooke | |
| 6,080,488 A | 6/2000 | Hostettler | |
| 6,117,449 A | 9/2000 | See | |
| 6,120,904 A | 9/2000 | Hostettler | |
| 6,121,341 A | 9/2000 | Sawhney | |
| 6,129,761 A | 10/2000 | Hubbell | |
| 6,132,468 A | 10/2000 | Mansmann | |
| 6,139,963 A | 10/2000 | Fujii | |
| 6,146,686 A | 11/2000 | Leitao | |
| 6,156,345 A | 12/2000 | Chudzik | |
| 6,156,572 A | 12/2000 | Bettamkonda | |
| 6,162,456 A | 12/2000 | Dunbar | |
| 6,180,132 B1 | 1/2001 | Huang | |
| 6,180,606 B1 | 1/2001 | Chen | |
| 6,184,197 B1* | 2/2001 | Heinzman et al. | 510/475 |
| 6,187,048 B1 | 2/2001 | Milner et al. | |
| 6,207,185 B1 | 3/2001 | See et al. | |
| 6,211,296 B1 | 4/2001 | Frate | |
| 6,224,893 B1 | 5/2001 | Langer | |
| 6,231,605 B1 | 5/2001 | Ku | |
| 6,232,406 B1 | 5/2001 | Stoy | |
| 6,238,691 B1 | 5/2001 | Huang | |
| 6,268,405 B1 | 7/2001 | Yao | |
| 6,271,278 B1 | 8/2001 | Park et al. | |
| 6,280,475 B1 | 8/2001 | Bao | |
| 6,306,424 B1 | 10/2001 | Vyakarnam | |
| 6,365,149 B2 | 4/2002 | Vyakarnam | |
| 6,371,984 B1 | 4/2002 | Van Dyke | |
| 6,372,283 B1 | 4/2002 | Shim | |
| 6,375,634 B1 | 4/2002 | Carroll | |
| 6,387,325 B1 | 5/2002 | Keusch | |
| 6,402,784 B1 | 6/2002 | Wardlaw | |
| 6,443,988 B2 | 9/2002 | Felt | |
| 6,509,098 B1 | 1/2003 | Merrill | |
| 6,531,147 B2 | 3/2003 | Sawhney | |
| 6,533,817 B1 | 3/2003 | Norton | |
| 6,583,219 B2 | 6/2003 | Won | |
| 6,602,952 B1 | 8/2003 | Bentley | |
| 6,608,117 B1 | 8/2003 | Gvozdic | |
| 6,620,196 B1 | 9/2003 | Trieu | |
| 6,626,945 B2 | 9/2003 | Simon | |
| 6,629,997 B2 | 10/2003 | Mansmann | |
| 6,630,457 B2 | 10/2003 | Aeschlimann et al. | |
| 6,632,246 B1 | 10/2003 | Simon | |
| 6,645,517 B2 | 11/2003 | West | |
| 6,692,738 B2 | 2/2004 | MacLaughlin | |
| 6,706,690 B2 | 3/2004 | Reich | |
| 6,709,668 B2 | 3/2004 | Won | |
| 6,710,104 B2 | 3/2004 | Haraguchi | |
| 6,710,126 B1 | 3/2004 | Hirt | |
| 6,723,781 B1 | 4/2004 | Frate | |
| 6,730,298 B2 | 5/2004 | Griffith-Cima | |
| 6,733,533 B1 | 5/2004 | Lozier | |
| 6,780,840 B1 | 8/2004 | DeVore | |
| 6,783,546 B2 | 8/2004 | Zucherman | |
| 6,783,721 B2 | 8/2004 | Higham | |
| 6,803,420 B2 | 10/2004 | Cleary | |
| 6,852,772 B2 | 2/2005 | Muratoglu | |
| 6,855,743 B1 | 2/2005 | Gvozdic | |
| 6,861,067 B2 | 3/2005 | McGhee | |
| 7,235,592 B2* | 6/2007 | Muratoglu et al. | 522/154 |
| 7,531,000 B2 | 5/2009 | Hodorek | |
| 2001/0026810 A1 | 10/2001 | McGhee et al. | |
| 2001/0032019 A1 | 10/2001 | Van Dyke | |
| 2001/0049417 A1 | 12/2001 | Frate | |
| 2001/0053897 A1 | 12/2001 | Frate | |
| 2002/0022884 A1 | 2/2002 | Mansmann | |
| 2002/0026244 A1 | 2/2002 | Trieu | |
| 2002/0029083 A1 | 3/2002 | Zucherman | |
| 2002/0049498 A1 | 4/2002 | Yuksel | |
| 2002/0131952 A1 | 9/2002 | Hennink | |
| 2002/0151979 A1 | 10/2002 | Lambrecht | |
| 2002/0173855 A1 | 11/2002 | Mansmann | |
| 2002/0193531 A1 | 12/2002 | Stoy | |
| 2003/0008396 A1 | 1/2003 | Ku | |
| 2003/0065389 A1 | 4/2003 | Petersen | |
| 2003/0080465 A1 | 5/2003 | Higham | |
| 2003/0099709 A1* | 5/2003 | Shah et al. | 424/469 |
| 2003/0130427 A1 | 7/2003 | Cleary | |
| 2003/0152528 A1* | 8/2003 | Singh et al. | 424/53 |
| 2003/0170308 A1* | 9/2003 | Cleary et al. | 424/486 |
| 2003/0195628 A1 | 10/2003 | Bao | |
| 2003/0232895 A1 | 12/2003 | Omidian | |
| 2003/0236323 A1 | 12/2003 | Ratner | |
| 2004/0002764 A1 | 1/2004 | Gainor | |
| 2004/0005423 A1 | 1/2004 | Dalton | |
| 2004/0030392 A1 | 2/2004 | Lambrecht | |
| 2004/0039447 A1 | 2/2004 | Simon | |
| 2004/0092653 A1 | 5/2004 | Ruberti | |
| 2004/0096509 A1 | 5/2004 | Hutchens | |
| 2004/0116641 A1 | 6/2004 | Mather | |
| 2004/0121951 A1 | 6/2004 | Rhee | |
| 2004/0127618 A1* | 7/2004 | Ulmer et al. | 524/379 |
| 2004/0127992 A1 | 7/2004 | Sehman | |
| 2004/0131582 A1 | 7/2004 | Grinstaff | |
| 2004/0133280 A1 | 7/2004 | Trieu | |
| 2004/0143329 A1 | 7/2004 | Ku | |
| 2004/0147673 A1 | 7/2004 | Calabro | |
| 2004/0153163 A1 | 8/2004 | Posner | |
| 2004/0161444 A1 | 8/2004 | Song | |
| 2004/0171740 A1 | 9/2004 | Ruberti | |
| 2004/0199250 A1 | 10/2004 | Fell | |
| 2004/0220296 A1 | 11/2004 | Lowman | |
| 2004/0242770 A1 | 12/2004 | Feldstein | |
| 2004/0244978 A1 | 12/2004 | Shaarpour | |
| 2005/0004560 A1 | 1/2005 | Cox | |
| 2005/0027069 A1 | 2/2005 | Rhee | |
| 2005/0048103 A1 | 3/2005 | Cleary | |
| 2005/0049365 A1 | 3/2005 | Cleary | |
| 2005/0075454 A1* | 4/2005 | Plochocka et al. | 525/54.3 |
| 2005/0095296 A1 | 5/2005 | Lowman | |
| 2005/0107561 A1 | 5/2005 | Lee et al. | |
| 2005/0197441 A1* | 9/2005 | Shibutani et al. | 524/459 |
| 2006/0078587 A1 | 4/2006 | Leong | |
| 2006/0141002 A1 | 6/2006 | Liu | |
| 2006/0188487 A1* | 8/2006 | Thomas et al. | 424/93.7 |
| 2007/0004861 A1 | 1/2007 | Cai et al. | |
| 2007/0202323 A1* | 8/2007 | Kleiner et al. | 428/336 |
| 2007/0293651 A1* | 12/2007 | Tada et al. | 528/232 |
| 2008/0090145 A1* | 4/2008 | Hiwara et al. | 429/188 |
| 2009/0053318 A1 | 2/2009 | Tan | |

FOREIGN PATENT DOCUMENTS

| | | |
|---|---|---|
| EP | 0290616 | 11/1988 |
| EP | 0365108 | 4/1990 |
| EP | 0505634 | 9/1992 |
| EP | 0696210 | 2/1996 |
| EP | 0738762 | 4/1996 |
| EP | 0784987 | 7/1997 |
| EP | 0845480 | 6/1998 |
| EP | 0927053 | 7/1999 |
| EP | 1079224 | 2/2001 |
| EP | 1174463 | 1/2002 |
| EP | 1593400 | 11/2005 |
| EP | 1595899 | 11/2005 |
| FR | 2786400 | 6/2000 |
| FR | 2865939 | 8/2005 |
| FR | 2866571 | 8/2005 |
| GB | 2338958 | 10/2000 |
| JP | 01178545 | 7/1987 |
| JP | 01305959 | 12/1989 |
| JP | 03141957 | 6/1991 |
| JP | 04303444 | 10/1992 |
| JP | 09124730 | 5/1997 |
| JP | 09124731 | 5/1997 |
| JP | 10036524 | 2/1998 |

| | | |
|---|---|---|
| JP | 10036534 | 2/1998 |
| JP | 10043286 | 2/1998 |
| JP | 10306534 | 2/1998 |
| WO | 9015082 | 12/1990 |
| WO | 94/13235 | 6/1994 |
| WO | 9417851 | 8/1994 |
| WO | WO 9502616 A2 * | 1/1995 |
| WO | 9526699 | 10/1995 |
| WO | 9640304 | 4/1998 |
| WO | 9817215 | 4/1998 |
| WO | 9853768 | 12/1998 |
| WO | 9903454 | 1/1999 |
| WO | 9913923 | 3/1999 |
| WO | 9907320 | 12/1999 |
| WO | 9967320 | 12/1999 |
| WO | 0117574 | 3/2001 |
| WO | WO 01/19283 | 3/2001 |
| WO | 0177197 | 10/2001 |
| WO | WO01/77197 | 10/2001 |
| WO | 0204570 | 1/2002 |
| WO | 0213871 | 2/2002 |
| WO | 02060501 | 8/2002 |
| WO | 02087642 | 11/2002 |
| WO | 02087645 | 11/2002 |
| WO | 03008007 | 1/2003 |
| WO | 03074099 | 9/2003 |
| WO | 03092359 | 10/2003 |
| WO | WO 03/082359 | 10/2003 |
| WO | 2004007651 | 1/2004 |
| WO | 2004029174 | 4/2004 |
| WO | 2004031253 | 4/2004 |
| WO | 2004047690 | 6/2004 |
| WO | 2004055057 | 7/2004 |
| WO | 2004060427 | 7/2004 |
| WO | 2004063388 | 7/2004 |
| WO | 2004064693 | 8/2004 |
| WO | 2004066704 | 8/2004 |
| WO | 2004069296 | 8/2004 |
| WO | 2004072138 | 8/2004 |
| WO | 2004093786 | 11/2004 |
| WO | 2005004943 | 1/2005 |
| WO | WO2005004943 | 1/2005 |
| WO | 2005035726 | 4/2005 |
| WO | WO 2005030832 A1 * | 4/2005 |
| WO | 2006021054 | 3/2006 |
| WO | 2006091706 | 8/2006 |
| WO | 2007067697 | 6/2007 |
| WO | 2007015208 | 8/2007 |
| WO | WO 2008/144514 | 11/2008 |
| WO | 2009020793 | 2/2009 |
| WO | WO 2009/032430 | 3/2009 |
| WO | WO 2009/088654 | 5/2010 |

OTHER PUBLICATIONS

Li et al. Analytical Biochemistry 256, 130-132 (1998).*
Rao et al. J. Chem. Soc., Dalton Trans., 2001, 1939-1944.*
Haralabakopoulos et al. J. Appl. Polym. Sci. 1998, 69, 1885-1890.*
EP Search Report for EP06255568.5, Jun. 15, 2007.
Noguchi et al., Poly(vinyl Alcohol) Hydrogel as an Artificial Articular Cartilage: Evaluation of Biocompatability. J. Applied Biomaterials, vol. 2, 101-107 (1991).
Hassan et al. "Structure and Applications of Poly(vinyl Alcohol) Hydrogels Produced by Conventional Crosslinking or by Freezing/Thawing Methods." Advances in Polymer Science, vol. 153, 2000.
Anseth et al. "In situ forming degradable networks and their application in tissue engineering and drug delivery." J. Controlled Release 78 (2002), 199-209, 2002.
Lin-Gibson et al. "Synthesis and Characterization of PEG Dimethacrylates and Their Hydrogels." Biomacromolecules 2004, 5, 1280-1287, 2004.
Peppas et al. Structure and Applications of Poly(vinyl alcohol) Hydrogels Produced by Conventional Crosslinking or b Freezing/Thawing Methods. Adv. Polymer Sci. 153, 37 (2000).
LeGeros R. Z., "Calcium phosphates in oral biology and medicine," Monograph in Oral Science, vol. 15, pp. 1-201.
Chow et al.,"Octacalcium Phosphate," Monograph in Oral Science, vol. 18, pp. 94-112 and 130-148.
Peppas et al. "Physicochemical Foundations and Structural Design of Hydrogels in Medicine and Biology." Ann. Rev. Biomed. Eng. 2, 9-29 (2000).
Hassan et al. "Cellular PVA Hydrogels Produced by Freeze/Thawing." J. Appl. Poly. Sci. 76, 2075 (2000).
Moro et. al. "Surface Grafting of Artificial Joints with Biocompatible Polymer for Preventing Periprosthetic Osteolysis." Nature Materials, 3, 829 (2004).
Hickey et al. :Solute Diffusion in Poly(vinyl)alchohol/poly(acrylic acid) composite membranes prepared by freezing/thawing techniques. Polymer 38, pp. 5931-5936 (1997).
Wang B., et al. The Influence of Polymer concentration on the Radiation-chemical Yield of Intermolecular Crosslinking of Poly(Vinyl Alcohol) by gamma-rays in Deoxygenated Aqueous Solution. Radiation Physics and Chemistry, 2000. 59: p. 91-95.
Rosiak, J. M. & Ulanski, P. Synthesis of hydrogels by irradiation of polymers in aqueous solution, Radiation Physics and Chemistry 1999 55: 139-151.
Stammen, J. A., et al. Mechanical properties of a novel PVA hydrogel in shear and unconfined compression Biomaterials, 2001 22: p. 799-806.
Yamaura, K., et al. Properties of gels obtained by freezing/thawing of poly(vinyl alcohol)/water/dimethyl sulfoxide solutions. Journal of Applied Polymer Science 1989 37:2709-2718.
Lozinsky, V. I. and Damshkaln, L. G. Study of cryostructuration of polymer systems. XVII. Poly(vinyl alcohol) cryogels: Dynamics of cryotropic gel formation. Journal of Applied Polymer Science 2000 77:2017-2023.
Oka M et al. "Development of artificial articular cartilage," Pro. Inst. Mech. Eng. 2000 214:59-68.
EP Search Report for EP 06256525.4 dated May 20, 2007.
Babb et al. "Perfluorcyclobutane Aromatic Ether Polymers. III. Synthesis and . . . " J. Applied. Polymer Sci., vol. 69, (1998), pp. 2005-2012.
Glossary of Basic Terms in Polymer Science published by IUPAC, Pure Appl. Chem., 68, 2287-2311 (1996).
EP Search Report for EP06256452.1 dated May 23, 2007.
ISR/WO for PCT/US2006/046725 dated Jul. 28, 2008.
Park K.R. et al. "Synthesis of PVA/PVP Hydrogels having Two-Layer by Radiation and their Physical Properties." Rad. Phys. and Chem., Jun. 2003, pp. 361-365. vol. 67, No. 3-4.
Hassan C.M. "Diffusional Characteristics of Freeze/Thawed Poly(vinyl alcohol) hydrogels: Applications to protein controlled release from multilaminate devices." Eur. J. Pharm. and Biopharm., 2000, pp. 161-165, vol. 49.
Bass L.S. "Laser Tissue Welding: A Comprehensive Review of Current and Future Clinical Applications," Lasers in Surgery and Medicine, 1995, pp. 315-349. vol. 17.
Search Report for PCT/US2008/071435 dated Feb. 2, 2009.
ISR/WO for PCT/US20071064782 dated May 3, 2008.
ISR/WO for PCT/EP2005/010931 dated Feb. 16, 2006.
Bryant, S.J. et al. "Crosslinking Density Influences Chondrocyte Metabolism in Dynamically Leaded Photocrosslinked Poly(ethylene glycol) Hydrogels." Ann. Biomed. Eng., Mar. 2004, pp. 407-417, vol. 3, No. 3.
Bryant, S.J. et al. "The Effects if Scaffold thickness on Tissue Engineered Cartilage in Photocrosslinked Poly (ethylene oxide) hydrogels." Biomaterials 22, 2001, pp. 619-628.
Bryant, S.J. et al. "Photocrosslinkable Poly(ethylene oxide) and Poly (vinyl alcohol) Hydrogels for Tissue Engineering Cartilage." 21st Annual Conference and the 1999 Annual Fall Meeting of the Biomedical Engineering Society, Oct. 13-15, 1999, Atlanta, GA; Engineering in Medicine and Biology 1999, p. 751, vol. 2.
Durmaz, S. et al. "Phase Separation during the Formation of Poly(acrylamide) Hydrogels" Polymer 41, 2000, pp. 5729-5735.
Gong, J.P. et al. "Friction of Polymer Gels and the Potential Application as Artificial Cartilage." SPIE, Mar. 1999, pp. 218-225, vol. 3669.
Guilherme, R. et al. "Hydrogels based on PAAm network with PNIPAAm included: hydrophilic-hydrophobic transition measured by the partition of Organe II and Methylene Blue in Water." Polymer 44, 2003, pp. 4213-4219.

Hassan, C.M. et al. "Modeling of Crystal Dissolution of Poly(vinyl alcohol) gels produced by freezing/thawing processes." Polymer 41, 2000, pp. 6729-6739.

Hassan, C.M. et al. "Structure and Morphology of Freeze/Thawed PVA Hydrogels," Macromolecules, 2000, pp. 2472-2479, vol. 33, No. 7.

Hickey, A.S. et al. "Solute Diffusion in Poly(vinyl alcohol)/poly(acrylic) acid composite membranes prepared by freezing/thawing techniques." J. Memb. Sci. 107, 1995, pp. 229-237.

Kobayashi, M. et al. "Development of An Artificial Meniscus Using Polyvinyl alcohol-hydrogel for early return to, and continuance of, athletic life in sportspersons with severe meniscus injury." ABSTRACT only, The Knee 10, 2003, p. 53.

Kobayashi, M. et al. "Preliminary Study of Polyvinylalcohol-hydrogel (PVA-H) artificial meniscus." Biomaterials 24, 2003, pp. 639-647.

Lester, C.L. et al. "Physical Properties of Hydrogels Synthesized from Lyotropic Liquid Crystalline Templates" Chem. Mater. 15, 2003, pp. 3376-3384.

Mano, V. et al. "Blends Composed of Poly(N-Isopropylacrylamide) and an EthyleneNinyl Alcohol Copolymer: Thermal and Morphological Studies" J. App. Polymer Sci., 2004, pp. 501-505.

Park, J.H. et al. "Hydrogels based on Poly(ethylene oxide) and poly (tetramethylene oxide) or poly)dimethyl siloxane). III. In vivo Biocompatability and Biostability." J. Biomed. Mater. Res. 64A, 2003, pp. 309-319.

Schmedlen, R.H. et al. "Photocrosslinkable polyvinyl alcohol hydrogels that can be modified with cell adhesion peptides for use in tissue engineering." Biomaterials, 23, 2002, pp. 4325-4332.

Suggs, L.J. et al. "In vitro Cytotoxicity and In Vivo Biocompatability of Poly(propylene fumurate-co-ethylene glycol) hydrogels." J. Biomed. Mater. Res., 1999, pp. 22-32, vol. 46.

Thomas, J.D. "Novel Associated PVA/PVDP Hydrogels for Nucleuc Pulposus Replacement." Thesis, Master of Science in Material Engineering Degree, Drexel University, Sep. 2001.

Ushio, K. et al. "Attachment of Artificial Cartilage to Underlying Bone." J. Biomed. Mater. Res. Part B: Appl. Biomater. 68B, 2004, pp. 59-68.

Ushio, K. et al. "Partial Hemiarthroplasty for the treatment of Osteonecrosis of the Femoral Head: An Experimental Study in the Dog." J. Bone Joint Surg., 2003, pp. 922-930, vol. 85B.

Zhang, X. et al. "Synthesis and Characterization of Partially Biodegradable, Temperature and pH Sensitive Dex-MA/PNIPAAm Hydrogels." Biomat., 25, 2004, pp. 4719-4730.

"Lecture 7: Hydrogel Biomaterials: Structure and Physical Chemistry," Spring 2003, 8 pages.

ISR/WO for PCT/US20061006356 dated Jun. 22, 2006, 9 pages.

Bray, J.C. et al. "Poly(vinyl Alcohool) Hydrogels: Formation by Eelctron Beam Irradiation of Aqueous Solutions and Subsequent Crystallization." J. Applied Polymer Sci., vol. 17, pp. 3779-3794, 1973.

Bray, J.C. et al. "Poly(vinyl Alcohol) Hydrogels for Synthetic Articular Cartilage Material, " Biomed. Mater. Res., vol. 7, pp. 431-443, 1973.

Kawanishi, K. Thermodynamic Consideration of the Sol-Gel Transition in Polymer Solutions. 35th Annual Meeting of the Society of Polymer Science, Japan 1986.

Lozinsky, V.I. et al. "Study of Cryostructures of Polymer Systems, XIV. Poly(vinyl alchohol) Cryogels: Apparent Yield of Freeze-Thaw Induced Gelation of Concentrated Aqueous Solutions of the Polymer." J. Applied Polymer Sci., vol. 77, 1822,1831 (2000).

Lozinsky, V.I. et al. "Study of Cryostructuration of Polymer Systems, XVII. Poly(vinyl alcohol) Cryogels: Dynamics of the Cryotropic Gel Formation." J. Appl. Polymer Sci., vol. 77, 2017-2023 (2000).

Lozinsky, V.I. et al. "Swelling Behavior of poly (vinyl alcohol) cryogels employed as matrices for cell immobilization." Enzyme Microb. Technol., vol. 18.

Peppas et al. "Reinforced Uncrosslinkable Poly (vinyl alcohol) gels produced by cyclic freezing-thawing processes: A Short Review." J. Controlled Release, 16 (1991), 305-310.

Mondino, A.V. et al. "Physical properties of gamma irradiated poly (vinyl alcohol) hydrogel preparations" Radiation Physics and chemistry, 55, p. 723,726 (1999).

Urushizaki, F. Swelling and Mechanical Properties of Poly (vinyl alcohol) Hydrogels. Intl. J. Pharma., 58, 135-142, 1990.

Lozinsky, V.I. "On the Possibility of Mechanodestruction of Poly (vinyl Alcohol) Molecules under Moderate Freezing of its Concentrated Water Solutions." Polymer Bulletin, 15, p. 333-340 (1986).

Yokoyama, F. "Morphology and Structure of Highly Elastic Poly (vinyl alcohol) Hydrogel Prepared by Repeated Freezing-and-Melting" Colloid & Polymer Sci. 264, 595-601 (1986).

Covert, R.J. et al. "Friction and Wear Testing of a New Biomaterial for Use as an Articular Cartilage Substitute," BED 50 (2001), 355-356, Bioengineering Conference, ASME 2001.

Ding, Mei Yee. Characterisation of Polyvinyl Alcohol Hydrogels, 2003. Undergraduate Chemical Engineering Thesis, University of Queensland, Brisbane QLD 4072, Australia http://www.cheque.uq.edu.au/ugrad/theses/2003/pdf/CHEE4006/40054522/40054522.pdf (working link on 04/20/1009).

Jaguar-Grodzinski, J. "Biomedical Application of Functional Polymers." Reactive and Functional Polymers 39 (1999) 99-138.

Ulanski, P. et al. "OH-Radical induced crosslinking and strand breakage of poly (vinyl alcohol) in aqueous solution in the absence and presence of oxygen. A pulse radiolysis and product study" Macromol. Chem. Phys. 195, p. 1443-14461 (1994).

International Search Report/Written Opinion for PCT/US2008/083213.

Taguchi. Chemistry Letters, 711-712 (1998).

Lu et al. Journal of Controlled Release, 57, 291-300 (1999).

West et al. Reactive Polymers, 139-147 (1995).

Green et al. Organic Chemistry Principles and Industrial Practice. Wiley VCH, 2003.

Mondino et al. Rad. Chem. and Phys. 55, 723-726 (1999).

Jagur-Grodzinski in Reactive and Functional Polymers, 39, 99-139 (1999).

Tripathy et al. "Novel Flocculating Agent Based on Sodium Alginate and Acrylamide." European Polymer Journal. 35, 2057-2072 (1999).

IPRP from PCT/US2008/071539.

IPRP from PCT/US2008/071435.

Hickey et al., "Mesh Size and Diffusive Characteristics of Semicrystalline . . . ", Journal of Membrane Science 107 (1995), pp. 229-237.

PCT Invitation to Pay Additional Fees for PCT Application No. PCT/US2006/046725 dated Apr. 22, 2008, 8 pgs.

Preliminary Report on Patentability and Written Opinion for PCT/US2008/086817 dated Jul. 6, 2010.

Carey et al., Adv. Org. Chem., Part B., p. 829, 2001.

* cited by examiner

REACTIVE COMPOUNDING OF HYDROGELS

FIELD OF THE INVENTION

The present invention provides methods for forming a hydrogel material during processing using reactive compounding.

BACKGROUND

Hydrogels are water-swellable or water-swollen materials whose structure is typically defined by a crosslinked or interpenetrating network of hydrophilic homopolymers or copolymers. The hydrophilic homopolymers or copolymers can be water-soluble in free form, but in a hydrogel they may be rendered insoluble generally due to the presence of covalent, ionic, or physical crosslinks. In the case of physical crosslinking, the linkages can take the form of entanglements, crystallites, or hydrogen-bonded structures. The crosslinks in a hydrogel provide structure and physical integrity to the polymeric network.

Hydrogels can be classified as amorphous, semicrystalline, hydrogen-bonded structures, supermolecular structures, or hydrocolloidal aggregates. Numerous parameters affect the physical properties of a hydrogel, including porosity, pore size, nature of gel polymer, molecular weight of gel polymer, and crosslinking density. The crosslinking density influences the hydrogel's macroscopic properties, such as volumetric equilibrium swelling ratio, compressive modulus, or mesh size. Pore size and shape, pore density, and other factors can impact the surface properties, optical properties, and mechanical properties of a hydrogel.

Hydrogels have shown promise in biomedical and pharmaceutical applications, mainly due to their high water content and rubbery or pliable nature, which can mimic natural tissue and can facilitate the release of bioactive substances at a desired physiological site. For example, hydrogels have been used and/or proposed in a variety of tissue treatment applications, including as implants, tissue adhesives, bone grafts for spinal and orthopedic treatments such as meniscus and articular cartilage replacement, and intervertebral disc nucleoplasty. One drawback to the use of conventional hydrogels in certain tissue treatment applications, and in particular bone tissue treatments, is that such hydrogels are typically weak materials that fracture easily and do not have desired levels of durability and wear resistance. Devices made from polyvinyl alcohol (PVA) hydrogels have been observed to fail due to wear, such as by tearing, abrasion, or shredding.

Mixing two or more polymers together to produce blends or alloys is a strategy for achieving a specific combination of physical properties. Mixing, as used herein, means the break-up of droplets of one polymer to obtain a dispersed phase with a very small size in another polymer. Normally, blending, also referred to as compounding, is used to combine the properties of two or more polymers and is performed in extruders. However, it is often found that the material properties are not as good as expected due to a poor interfacial adhesion between the minor and the major component.

Thus, there is a need for an efficient and cost-effective means of preparing hydrogels having desired physical properties.

SUMMARY OF THE INVENTION

The present invention provides a method of forming a modified hydrogel material by reactive compounding. To that end, a hydrogel material is mixed with a plasticizer in the presence of heat and pressure in a compounding apparatus. During mixing of the hydrogel material and the plasticizer, a reactive chemical compound is added to the compounding apparatus. Suitable reactive chemical compounds contain reactive functional groups such as carboxylic acid, alkoxide, silane, epoxide, organometallic, aldehyde, amine, amide, carbonate, carbamate, sulfonic acid, sulfonimide, urea, or cyano functional groups. The reactive functional groups of the reactive chemical compound react with the hydrogel material to form a modified hydrogel material.

DETAILED DESCRIPTION

The present invention provides for methods of forming a modified hydrogel material by reactive compounding. Reactive compounding, also termed reactive processing or reactive extrusion, refers to the occurrence of chemical reactions during processing of polymers. In reactive compounding, chemical bonds are created across the interface between the minor and the major polymer components. This chemical bonding is generally done by functionalizing one of the components with reactive groups, such as carboxylic acid groups. The component may be functionalized with reactive groups by graft reactions. These groups then react with existing reactive sites of the other component. As an alternative, both components can be functionalized with mutually reactive sites. Additionally, reactive compounding allows bulk quantities of the product to be formed.

A primary distinguishing characteristic of reactive compounding is that chemical reactions are deliberately carried out during continuous melt extrusion to achieve desired product properties. In this case, a compounding or extrusion apparatus is used as a chemical reactor instead of only as a processing aid. A compounding apparatus, used herein, includes compounding reactor, compounding device, extrusion reactor, extrusion device, etc., as known to one skilled in the art. The chemical reaction may take place in the polymer melt phase or in the liquid phase, for instance, when bulk polymerization of monomers is performed in a compounding apparatus. In one embodiment, the chemical reaction is the formation of an ester. Additionally, the chemical reaction may take place in the solid phase when the polymer is conveyed through the compounding apparatus prior to the addition of a solvent slurry. Also, in the case of a bulk polymer, the chemical reaction may take place in the melting stage.

Reactive compounding can occur in conventional single-screw or twin-screw extruders. Because of their versatility, most extrusion devices are twin-screw extruders, which possess a segmented barrel, each segment of which can be individually cooled or heated externally. In addition to external heating, a molten material may be shear heated by the resistance of viscous material to the conveying motion of the screw; these processes can provide energy for chemical reaction.

Extruder screws often have specialized sections or configurations, e.g., high shear mixing sections. Twin-screw extruder screws may be equipped with interchangeable screw elements that provide different degrees of mixing and surface area exposure by varying the depth between screw flights, the individual flight thicknesses, and direction and degree of flight pitch. Kneading blocks may be included as screw elements to provide intensive mixing. In addition, the two screws may be co-rotating or counter-rotating, intermeshing or non-intermeshing. By varying the external heating, the screw element configuration, and the clearance between screw and barrel wall in individual barrel segments, the total energy and the degree of mixing of material in each barrel segment may be varied. In this way, an extruder can have controlled reaction zones made up of individual barrel segments. In each of these segments, sequential chemical processes can take place.

In accordance with the invention, to provide a modified hydrogel material by reactive compounding, a hydrogel material is mixed with a plasticizer in the presence of heat and pressure in an extrusion device. During mixing, a reactive chemical compound is added to the mixture. The reactive chemical compound contains functional groups that react with the hydrogel material to form a modified hydrogel material. The functional groups can be carboxylic acid, alkoxide, silane, epoxide, organometallic, aldehyde, amine, amide, carbonate, carbamate, sulfonic acid, sulfonimide, urea, or cyano groups. Additionally, the reactive mixture may contain a reactive hydrogel material and another chemical compound wherein the functional groups are placed on the hydrogel material and react with a chemical compound.

In various embodiments, a modifier may be added to the reactive mixture to induce chemical changes in, for example, the hydrogel material. In one embodiment, the modifier decomposes to form free radicals. Examples of free radical-generating modifiers include organic peroxides, hydroperoxide, azo compounds, or diazo compounds. In this case, the free radical modifier decomposes and the resultant free radical reacts with at least one of the components in the reactive mixture. In one embodiment, the free radical treated component then reacts with at least one other component in the reactive mixture, to create the modified hydrogel.

In one embodiment, the reactive chemical compound is selected from the group consisting of carboxyl-terminated poly-N-vinylpyrrolidone, carboxyl-terminated poly-2-vinyl pyridine, carboxyl-terminated poly-N-vinyl imidazole, alpha-methoxy-omega-succinic acid terminated polyethylene glycol, and glutaraldehyde and combinations thereof.

In one embodiment, the hydrogel material comprises at least one polymer that is a hydrophilic polymer. In an exemplary embodiment, the hydrophilic polymer is polyvinyl alcohol, polyvinyl pyrilidone, poly(ethylene-co-vinyl alcohol), or a derivative thereof. By way of illustration only, other hydrophilic polymers that may be suitable include poly(hydroxyethyl methacrylate), poly(acrylamide), poly(acrylic acid), hydrolyzed poly(acrylonitrile), poly(ethyleneimine), ethoxylated poly(ethyleneimine), poly(allylamine), or poly(glycol) as well as blends or mixtures of any of these hydrophilic polymers.

In some embodiments, the plasticizer is a solvent. In some embodiments, the plasticizer and/or solvent is an anhydrous compound such as anhydrous dimethyl sulfoxide, tetrahydrofurane, methylene chloride, ether, toluene, or dimethylforamide.

In some embodiments and as described above, the compounding apparatus is an extrusion reactor. In a typical reactive compounding process, the reactants are fed into the extruder feed throat where the material is usually heated to initiate reaction or increase the reaction rate. The reactant mixture is conveyed through sequential barrel segments where degree of mixing and specific energy input bring the reaction to the desired degree of completion within the limits of residence time in the extruder. At this stage, the reaction may be quenched by cooling or addition of a catalyst quencher where applicable, and volatile by-products or excess reactants may be removed. The molten polymer may be forced from the extruder through a die with one or more openings. The geometry of the die openings is one factor determining the pressure against which the extruder has to pump by the conveying motion of the internal screw. In some cases, polymer melt emerging from the die is usually rapidly cooled by contact with a fluid medium, such as water. In one embodiment, the modified hydrogel material is pelletized as it is extruded from the extrusion reactor. In a further embodiment, the pelletized, modified hydrogel material is formed at a rate of at least about 2 kg/hr.

In some embodiments, additional components may be added to the reactive mixture comprising the hydrogel material and the reactive chemical compound during the reaction or to the resultant modified hydrogel polymer while still in a flowable state. Examples of such additives include additional polymers, peptides and proteins, such as collagen, or conventional additives such as components for inhibiting or reducing crack formation or propagation, components for inhibiting or reducing creep, or particulates or other additives for imparting radiopacity to the article. By way of example only, an additive for imparting radiopacity can include metal oxides, metal phosphates, or metal sulfates, such as barium sulfate, barium titanate, zirconium oxide, ytterbium fluoride, barium phosphate, and ytterbium oxide.

The present invention provides not only a means for cost-efficient, bulk production of the modified hydrogel material, but it also enables the formation of a modified hydrogel material having high concentrations of polymer. High concentrations of polymer in the modified hydrogel material can only be achieved in a compounding or mechanical mixing apparatus because of the high viscosity of the material. In some embodiments, the modified hydrogel material has a polymer concentration of greater than about 30% w/v. In one embodiment, the modified hydrogel material has a polymer concentration of about 50% w/v. Additionally, because of the ability of the compounding apparatus to work with viscous materials, high molecular weight hydrogel materials may be used. Such high molecular weight hydrogel materials can impart increased mechanical strength to the resultant modified hydrogel material.

Typical operating conditions within the extrusion device are between about 70° C. to about 400° C. The extrusion temperature may be any temperature in a range in which the polymer material to be extruded is molten and flowed. Typical extruder residence times are between about 2 seconds and about 600 seconds. Residence time and, hence, the time available for chemical reaction is determined by extruder length, rate of introduction of reactants, and screw speed.

In some embodiments, the modified hydrogel material is thermoplastic in the form of a lyogel, which is a term generally used to describe the physical state of a hydrogel material before the solvent used to prepare the hydrogel material is replaced with water. The thermoplastic lyogel can be melted and re-solidified without losing its water-swellable properties. The thermoplastic quality of the modified hydrogel material as a lyogel allows for easy processability and end use. Upon melting, the lyogel becomes flowable and can therefore be extruded, injected, shaped, or molded.

The method of the present invention can be used to modify hydrogels to improve such properties as lubricity, creep, wear, shear resistance, mechanical strength, and compatibility. The modified hydrogel material of the present invention can be used in a variety of applications, including medical procedures, as known in the field. The modified hydrogel material can be employed as artificial meniscus or articular bearing components. The modified hydrogel material of the invention can also be used to replace or rehabilitate the nucleus pulposus of an intervertebral disc.

Various embodiments of modified hydrogel materials that may be formed in the present invention are set out in the following examples.

EXAMPLE 1

Table 1 shows the composition of modified hydrogel materials formed using the inventive method and compounds formed using traditional "bench-top" methods of forming hydrogels referred to as "Solution Rxn, Solution Casting". The graft weight is the molecular weight of the polymer (or polymers) used to modify the hydrogel component. In this case, the graft weight is the polymer in the reactive chemical compound column used to modify polyvinyl alcohol.

TABLE 1

Examples of Modified Hydrogel Materials

| Reactive Chemical Compound | PVA | Method | Graft Weight, g | PVA, g | Graft % | Poly. Conc, % w/v |
|---|---|---|---|---|---|---|
| Carboxyl terminated Poly(N-vinylpyrrolidone) | Aldrich, 99+%, 146-186k | Solution Rxn, Solution Casting | Polymer 1: 1.5 (Mn = 3600, Mw = 6800, Mw/Mn = 1.8) + Polymer 2: 0.5 (Mn = 10000, Mw = 15000, Mw/Mn = 1.5) | 10.00 | 16.7% | 16.7% |
| Carboxyl terminated Poly(N-vinylpyrrolidone) | Aldrich, 99+%, 146-186k | Solution Rxn, Solution Casting | 3 (Mn = 3600, Mw = 6800, Mw/Mn = 1.8) | 10.00 | 23.1% | 16.7% |
| N/A | JC-50, 99+%, 250k | Haake RheoMix, Morgan Press Inj. | N/A | 35.17 | 0.0% | 50.1% |
| Carboxyl terminated Poly(2-vinyl pyridine) | JC-50, 99+%, 250k | Haake RheoMix, Morgan Press Inj. | 2.54 (Mn = 53000, Mw = 56000, Mw/Mn = 1.06) | 32.50 | 7.2% | 50.0% |
| alpha-methoxy-omega-succinic acid terminated PEG | JC-50, 99+%, 250k | Haake RheoMix, Morgan Press Inj. | 2.51 (Mn = 16500, Mw = 17000, Mw/Mn = 1.03) | 32.50 | 7.2% | 50.0% |
| Carboxyl terminated poly(N-vinyl imidazole) | JC-50, 99+%, 250k | Haake RheoMix, Morgan Press Inj. | 2.53 (Mn = 13900, Mw/Mn = 7.90) | 32.51 | 7.2% | 50.0% |

In the first two examples in Table 1, a bench-top reaction occurred in a beaker equipped with a mechanical stirrer. Polyvinyl alcohol and dimethylsulfoxide (DMSO) were added to the beaker. The polyvinyl alcohol was 99+% hydrolyzed with a weight average molecular weight (Mw) of 146 kDa to 186 kDa and was used as received from Sigma-Aldrich (St. Louis, Mo.). The DMSO was used as received from Sigma-Aldrich and contained <0.4% water. The reactive chemical compound was carboxyl-terminated poly-N-vinylpyrrolidone. A mixture of two compounds, each having a different molecular weight, was used in the first example. The solution was heated to 90° C. for three hours. The solution was poured between two 8 in×8 in×0.05 in glass plates. The material was allowed to cool to room temperature. The dish was then placed into a freezer at −30° C. for twelve hours. The dish was removed from the freezer and the material was allowed to warm to room temperature. The resulting material was flexible and pliable. To extract the DMSO, 700 mL methanol was added to the resulting material. The resulting material remained translucent, flexible, and pliable. Because the process utilized a laboratory mixer, only a low polymer concentration in the hydrogel material was obtained, specifically 16.7% w/v.

In the third example in Table 1, a compounding apparatus was used, specifically a HAAKE Polylab® system equipped with a RheoMix, which was heated to 115° C. Polyvinyl alcohol and dimethylsulfoxide (DMSO) were added to the compounding apparatus. The polyvinyl alcohol was 99+% hydrolyzed with a weight average molecular weight (Mw) of 250 kDa and was used as received from Japan VAM & POVAL Co., Ltd. The DMSO was used as received from Sigma-Aldrich and contained <0.4% water. No reactive chemical compound was added. The blend was allowed to mix for 10 minutes. The blend was removed from the mixer, allowed to cool to room temperature, and chopped. The resultant material was translucent and pliable. The materials were molded utilizing a Morgan Press ram injection molder into 2½ in×2½ in×¼ in rectangular specimens. A high polymer concentration of 50.1% w/v was obtained by the non-reactive compounding method, but the hydrogel lacked the desired physical properties, such as durability and wear resistance.

In the last three examples in Table 1, modified hydrogel materials in accordance with the invention were made. A similar process was used as described for the third example, namely the polyvinyl alcohol was mixed with DMSO in a Haake Polylab® twin screw rheometer. However, during mixing, a reactive chemical compound was added, namely carboxyl-terminated poly-2-vinyl pyridine in the fourth example, alpha-methoxy-omega-succinic acid terminated polyethylene glycol in the fifth example, and carboxyl-terminated poly-N-vinyl imidazole in the sixth example. Blends were allowed to mix for 10 minutes. The blends were then removed from the mixer, allowed to cool to room temperature, and chopped. The resultant pliable materials were then post molded on a Morgan Press ram injection molder. A high polymer concentration of 50% w/v was obtained by the reactive compounding method as with the non-reactive compounding method in the third example, but the modified hydrogels prepared by reactive compounding are expected to exhibit improved physical properties.

The invention is further set forth in the claims listed below. This invention may take on various modifications and alterations without departing from the scope thereof. In describing embodiments of the invention, specific terminology is used for the sake of clarity. The invention, however, is not intended to be limited to the specific terms so selected, and it is to be understood that each term so selected includes all technical equivalents that operate similarly.

What is claimed is:

1. A method of forming a modified hydrogel material by reactive compounding, comprising:
   mixing a hydrogel material in an extrusion reactor at a temperature of about 70° C. to about 400° C.; and
   during mixing, adding to the extrusion reactor a reactive chemical compound selected from the group consisting of carboxyl-terminated poly-N-vinylpyrrolidone, carboxyl-terminated poly-2-vinyl pyridine, carboxyl-terminated poly-N-vinyl imidazole, and alpha-methoxy-omega-succinic acid terminated polyethylene glycol, and combinations thereof to react with the hydrogel material to form a modified hydrogel material, and wherein the modified hydrogel material has a polymer concentration of greater than about 30% w/v.

2. The method of claim 1 wherein the hydrogel material comprises at least one polymer that is a hydrophilic polymer.

3. The method of claim 2 wherein the hydrophilic polymer is polyvinyl alcohol, polyvinyl pyrillodone, poly(ethylene-co-vinyl alcohol), or polyacrylamide, or a derivative thereof.

4. The method of claim 1 further comprising adding a solvent to the mixed hydrogel material and the reactive chemical compound wherein the solvent is selected from the group consisting of dimethyl sulfoxide, tetrahydrofurane, methylene chloride, ether, toluene, and dimethylforamide, and combinations thereof.

5. The method of claim 1 wherein the extrusion reactor is a twin screw extruder.

6. The method of claim 5 further comprising the step of pelletizing the modified hydrogel material as it is extruded from the twin screw extruder.

7. The method of claim 6 wherein the pelletized, modified hydrogel material is formed at a rate of at least about 2 kg/hr.

8. A method of forming a modified hydrogel material by reactive compounding, comprising:
   mixing a hydrogel material comprising polyvinyl alcohol or a derivative thereof in an extrusion reactor at a temperature of about 70° C. to about 400° C.;
   during mixing, adding to the extrusion reactor a reactive chemical compound selected from the group consisting of carboxyl-terminated poly-N-vinylpyrrolidone, carboxyl-terminated poly-2-vinyl pyridine, carboxyl-terminated poly-N-vinyl imidazole, and alpha-methoxy-omega-succinic acid terminated polyethylene glycol, and combinations thereof to react with the hydrogel material to form a modified hydrogel material having a polyvinyl alcohol concentration of greater than about 30% w/v; and
   extruding the modified hydrogel material from the extrusion reactor and pelletizing the modified hydrogel material as it is extruded from the extrusion reactor.

9. The method of claim 8 wherein the extruding and pelletizing are carried out at a rate of at least about 2 kg/hr.

10. A method comprising:
    mixing a hydrogel material in an extrusion reactor; and
    during mixing, adding to the extrusion reactor a reactive chemical compound during continuous melt extrusion in the extrusion reactor at a temperature of about 70° C. to about 400° C., the reactive chemical compound selected from the group consisting of carboxyl-terminated poly-N-vinylpyrrolidone, carboxyl-terminated poly-2-vinyl pyridine, carboxyl-terminated poly-N-vinyl imidazole, and alpha-methoxy-omega-succinic acid terminated polyethylene glycol, and combinations thereof to react with the hydrogel material to form a modified hydrogel material, and wherein the modified hydrogel material has a polymer concentration of greater than about 30% w/v;
    extruding the modified hydrogel material from the extrusion reactor;
    pelletizing the extruded, modified hydrogel material; and
    post-molding the pelletized, modified hydrogel material.

11. The method of claim 10, further comprising selecting the hydrogel material to be polyvinyl alcohol.

12. The method of claim 10, further comprising selecting the reactive chemical compound to be carboxyl-terminated poly-2-vinyl pyridine.

13. The method of claim 10, further comprising selecting the reactive chemical compound to be alpha-methoxy-omega-succinic acid terminated polyethylene glycol.

14. The method of claim 10, further comprising selecting the reactive chemical compound to be carboxyl-terminated poly-N-vinyl imidazole.

* * * * *